United States Patent
Gaedker et al.

(10) Patent No.: US 12,460,661 B2
(45) Date of Patent: Nov. 4, 2025

(54) PNEUMATIC SUPPLY DEVICE FOR AN AGRICULTURAL TRACTOR

(71) Applicant: DEERE & COMPANY, Moline, IL (US)

(72) Inventors: Simon Gaedker, Glandorf (DE); Bernd Kneer, Viernheim (DE); Marc Schaefer, Mainz (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/813,491

(22) Filed: Aug. 23, 2024

(65) Prior Publication Data

US 2025/0075715 A1   Mar. 6, 2025

(30) Foreign Application Priority Data

Sep. 4, 2023   (DE) .......................... 102023123727.6

(51) Int. Cl.
| | |
|---|---|
| *F15B 21/048* | (2019.01) |
| *B60T 13/26* | (2006.01) |
| *B60T 17/00* | (2006.01) |
| *F15B 21/041* | (2019.01) |
| *F15B 21/0423* | (2019.01) |

(52) U.S. Cl.
CPC ............ *F15B 21/048* (2013.01); *B60T 13/26* (2013.01); *B60T 17/004* (2013.01); *F15B 21/0423* (2019.01); *F15B 21/041* (2013.01)

(58) Field of Classification Search
CPC .... B60T 13/26; B60T 17/004; F15B 21/0423; F15B 21/048
See application file for complete search history.

(56) References Cited

U.S. PATENT DOCUMENTS

| | | |
|---|---|---|
| 4,721,515 A | 1/1988 | Hata et al. |
| 4,812,148 A | 3/1989 | Hata et al. |
| 6,695,893 B2 | 2/2004 | Hoffman et al. |
| 9,783,019 B2 | 10/2017 | Diekmeyer |
| 2012/0031273 A1 * | 2/2012 | Heer .................... B60T 17/004 96/115 |

(Continued)

FOREIGN PATENT DOCUMENTS

| | | | |
|---|---|---|---|
| DE | 102004056883 A1 * | 6/2006 | ......... B60G 17/0523 |
| DE | 102007058385 A1 * | 4/2009 | ......... B01D 46/0086 |

(Continued)

OTHER PUBLICATIONS

DE 102004056883 A1 machine translation thereof (Year: 2006).*

(Continued)

*Primary Examiner* — Matthew Wiblin

(57) ABSTRACT

A pneumatic supply device for an agricultural tractor includes a compressed air source for producing a compressed air flow, a cooler for cooling the air flow produced, and a first air dryer, which is fed with the cooled air flow and via the outlet of which a first pneumatic consumer group can be supplied with dehumidified compressed air in accordance with a first dehumidification and flow capacity, and a second air dryer, which is fed with the cooled air flow and via the outlet of which a second pneumatic consumer group can be supplied with dehumidified compressed air in accordance with a second dehumidification and flow capacity.

6 Claims, 2 Drawing Sheets

(56) References Cited

U.S. PATENT DOCUMENTS

| | | | |
|---|---|---|---|
| 2014/0373718 A1* | 12/2014 | Bergemann | B60G 17/0408 |
| | | | 96/118 |
| 2015/0251646 A1* | 9/2015 | Eberling | B01D 53/261 |
| | | | 95/21 |
| 2017/0329354 A1* | 11/2017 | Wright | B01D 53/0446 |
| 2018/0257628 A1 | 9/2018 | Merkel et al. | |
| 2019/0232735 A1* | 8/2019 | Salzman | B60T 13/58 |
| 2020/0116145 A1* | 4/2020 | Park | B60T 17/02 |
| 2020/0240446 A1* | 7/2020 | Schnittger | B01D 53/0446 |

FOREIGN PATENT DOCUMENTS

| | | |
|---|---|---|
| DE | 102012007342 A1 | 6/2013 |
| EP | 2242934 B1 | 5/2013 |

OTHER PUBLICATIONS

DE 102007058385 A1 machine translation thereof (Year: 2009).*
European Search Report issued in application No. 24191644.4 dated Jan. 27, 2025, 20 pages.

* cited by examiner

PNEUMATIC SUPPLY DEVICE FOR AN AGRICULTURAL TRACTOR

CROSS-REFERENCE TO RELATED APPLICATIONS

This application claims priority to German Patent Application No. 102023123727.6, filed Sep. 4, 2023, which is hereby incorporated by reference.

FIELD OF THE DISCLOSURE

The disclosure relates to a pneumatic supply device for an agricultural tractor.

BACKGROUND

Pneumatic supply devices are generally used for the operation of a pneumatic wheel brake device on a trailer that can be attached to an agricultural tractor, and, in addition to a compressed air source designed as a compressor, they comprise a cooler for cooling the compressed air that has heated up due to compression and a downstream air dryer for removing the condensate that forms during cooling.

SUMMARY

In order to avoid impairing the functioning or life of the pneumatic wheel brake device by corrosion, relatively high requirements are imposed on the freedom from moisture of the compressed air supplied and thus on the dehumidification capacity of the air dryer. In order to exploit the limited installation space in the agricultural tractor as well as possible, the selected nominal flow capacity of the air dryer is no higher than necessary in order to favor as compact construction as possible. There is therefore limited capacity for a (simultaneous) supply of compressed air to other pneumatically operated units. This applies especially if these are distinguished by an increased compressed air consumption, as is typical, for example, with the use of a blow-off gun that can be connected externally via a compressed air coupling, a tire pressure control system or else pneumatically operated working units of mounted or ancillary implements that can be attached to the agricultural tractor.

In view of this, the object of the present disclosure is to improve a pneumatic supply device of the type mentioned at the beginning with regard to its universal use.

This object is achieved by a pneumatic supply device for an agricultural tractor having the features of one or more of the following embodiments.

The pneumatic supply device according to the disclosure for an agricultural tractor comprises a compressed air source for producing a compressed air flow, a cooler for cooling the air flow produced, and a first air dryer, which is fed with the cooled air flow and via the outlet of which a first pneumatic consumer group can be supplied with dehumidified compressed air in accordance with a first dehumidification and flow capacity, and a second air dryer, which is fed with the cooled air flow and via the outlet of which a second pneumatic consumer group can be supplied with dehumidified compressed air in accordance with a second dehumidification and flow capacity.

By using separate air dryers, it is possible to take appropriate account of the specific requirements of different pneumatic consumer groups in respect of the permissible moisture content of the compressed air supplied, on the one hand, and the compressed air consumption, on the other hand. This allows universal use of the pneumatic supply device for different consumer types.

The first pneumatic consumer group can be, for example, a pneumatic wheel brake device of a trailer that can be attached to the agricultural tractor; the second pneumatic consumer group, in contrast, can be any other pneumatically operated unit with a higher compressed air consumption but lower requirements on freedom from moisture of the compressed air supplied. By way of example, a blow-off gun that can be connected externally via a compressed air coupling, a tire pressure control system or else pneumatically operated working units of mounted or ancillary implements that can be attached to the agricultural tractor may be mentioned here. In contrast to the first pneumatic consumer group, the requirements on the dehumidification capacity of the air dryer are not high in the case of the latter, and therefore it can be of comparatively compact construction, despite the desired increased flow capacity.

In the present case, the flow capacity of the first and second air dryer is interpreted to mean its nominal (i.e., maximum possible) flow rate, and its dehumidification capacity is interpreted to mean the achievable degree of dehumidification of the air flow passing through.

Advantageous developments of the pneumatic supply device according to the disclosure can be found herein.

The cooled air flow is divided and fed in parallel to the first and the second air dryer. In this embodiment of the pneumatic supply device, an air dryer that is optimized as regards dehumidification and flow capacity can be provided for each of the two pneumatic consumer groups.

According to another embodiment of the pneumatic supply device, it is also conceivable that the cooled air flow is first of all passed through the second air dryer and then divided in order to supply the second pneumatic consumer group and the first air dryer. The second air dryer thus serves as a pre-dryer for the first air dryer, in which case the latter can then be of correspondingly more compact construction on account of the reduced dehumidification capacity to be provided. The flow capacity of the second air dryer or pre-dryer is chosen so that it can reliably cover the total compressed air consumption of the two pneumatic consumer groups.

In order to prioritize a supply of compressed air to the first pneumatic consumer group, it is furthermore possible to envisage that the second pneumatic consumer group is supplied with compressed air via an upstream pressure switching valve, wherein, when a predetermined supply pressure is undershot, the pressure switching valve adopts a closed position, with the result that the cooled air flow is available exclusively to the first pneumatic consumer group. For example, when the first pneumatic consumer group is a brake system which is formed by a pneumatic wheel brake device on a trailer that can be attached to the agricultural tractor and the correct operation of which always has priority.

Other features and aspects will become apparent by consideration of the detailed description, claims, and accompanying drawings.

BRIEF DESCRIPTION OF THE DRAWINGS

The pneumatic supply device according to the disclosure for an agricultural tractor is explained in more detail below with reference to the appended drawings. Component parts of equivalent or comparable function are identified by the same reference signs. In the drawings.

Like reference numerals are used to indicate like elements throughout the several figures.

DETAILED DESCRIPTION

Figure 1:
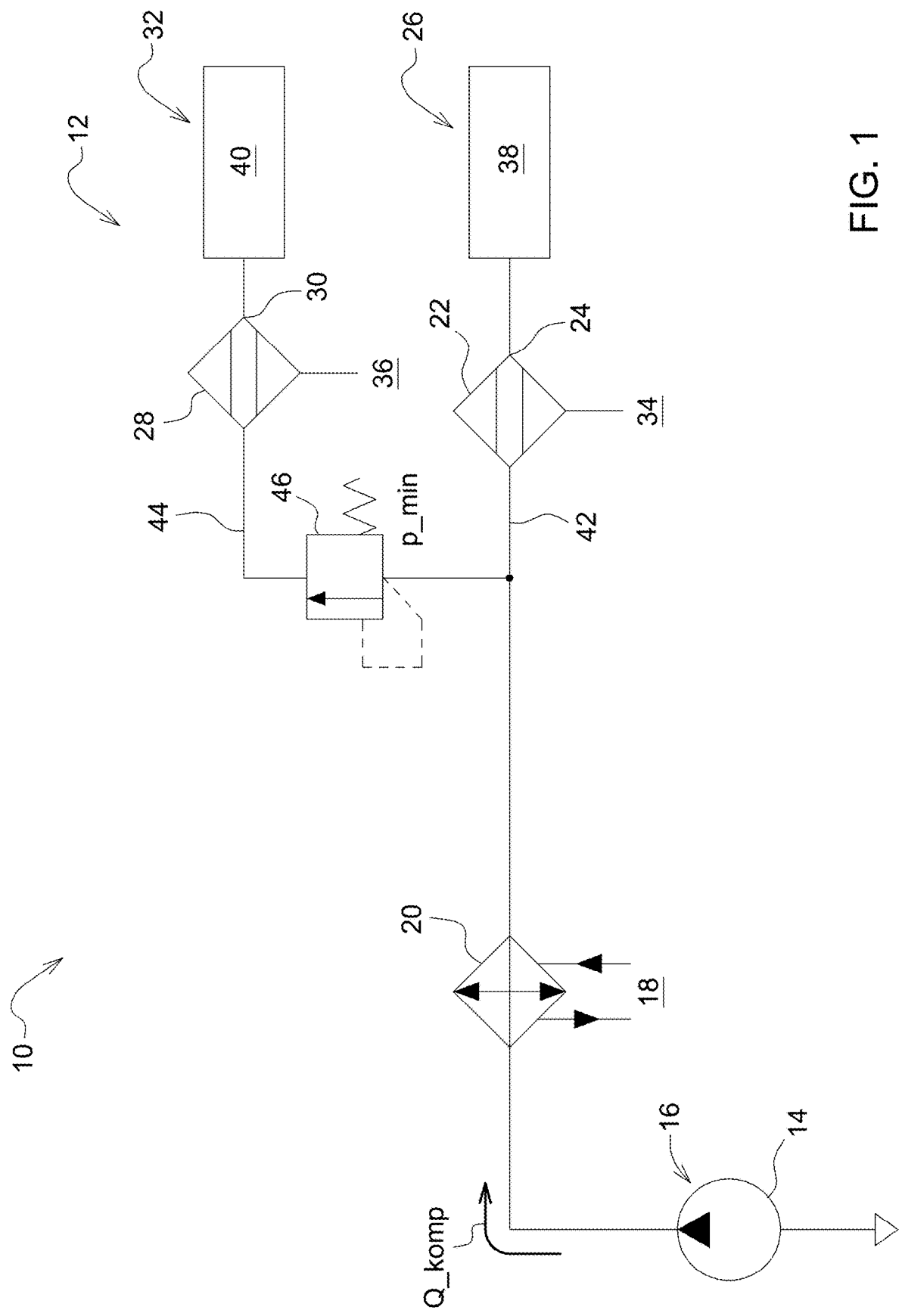
FIG. 1 shows a schematically illustrated block diagram of a first exemplary embodiment of the pneumatic supply device.

FIG. 1 shows a schematically illustrated block diagram of a first exemplary embodiment of the pneumatic supply device.

The pneumatic supply device 12, which is accommodated in an agricultural tractor 10 that is not shown specifically, comprises a compressed air source 16, designed as a compressor 14, for producing a compressed air flow Q_komp, a cooler 20, connected to a liquid cooling circuit 18, for cooling the air flow Q_komp produced, and a first air dryer 22, which is fed with the cooled air flow Q_komp and via the outlet 24 of which a first pneumatic consumer group 26 is supplied with dehumidified compressed air in accordance with a first dehumidification and flow capacity, and a second air dryer 28, which is fed with the cooled air flow Q_komp and via the outlet 30 of which a second pneumatic consumer group 32 is supplied with dehumidified compressed air in accordance with a second dehumidification and flow capacity. In this case, the air dryers 22, 28 connected downstream of the cooler 20 serve in each case to remove the condensate that forms during the cooling of the air flow Q_komp, which has heated up due to compression, said condensate being discharged via a respectively associated drainage connection 34, 36. It should be noted here that the cooler 20 does not necessarily have to be designed as an active liquid-air cooler but can also be designed as a passive cooler (based on convection) or an active air-air cooler.

According to the example, the first pneumatic consumer group 26 is a pneumatic wheel brake device 38 of a trailer that can be attached to the agricultural tractor 10; the second pneumatic consumer group 32, in contrast, can be any other pneumatically operated unit 40 with a higher compressed air consumption but lower requirements on freedom from moisture of the compressed air supplied. By way of example, a blow-off gun that can be connected externally via a compressed air coupling, a tire pressure control system or else pneumatically operated working units of mounted or ancillary implements that can be attached to the agricultural tractor 10 may be mentioned here.

According to the embodiment of the pneumatic supply device 12 which is illustrated in FIG. 1, the cooled air flow Q_komp is divided and fed in parallel to the first and the second air dryer 22, 28 via associated first and second supply lines 42, 44. In this case, an air dryer 22, 28 that is optimized as regards dehumidification and flow capacity is provided for each of the two pneumatic consumer groups 26, 32.

In order to prioritize a supply of compressed air to the first pneumatic consumer group 26, the second pneumatic consumer group 32 is supplied with compressed air via a pressure switching valve 46 connected upstream of the second air dryer 28 in the second supply line 44. As a departure from this, the pressure switching valve 46 may also be located in the second supply line 44 between the second air dryer 28 and the second pneumatic consumer group 32. When a predetermined supply pressure p_min is undershot, the pressure switching valve 46 adopts a closed position, with the result that the cooled air flow Q_komp is available exclusively to the first pneumatic consumer group 26. When the first pneumatic consumer group 26 is a brake system, which is formed by the pneumatic wheel brake device, 38 the correct operation of which always has priority.

Figure 2:
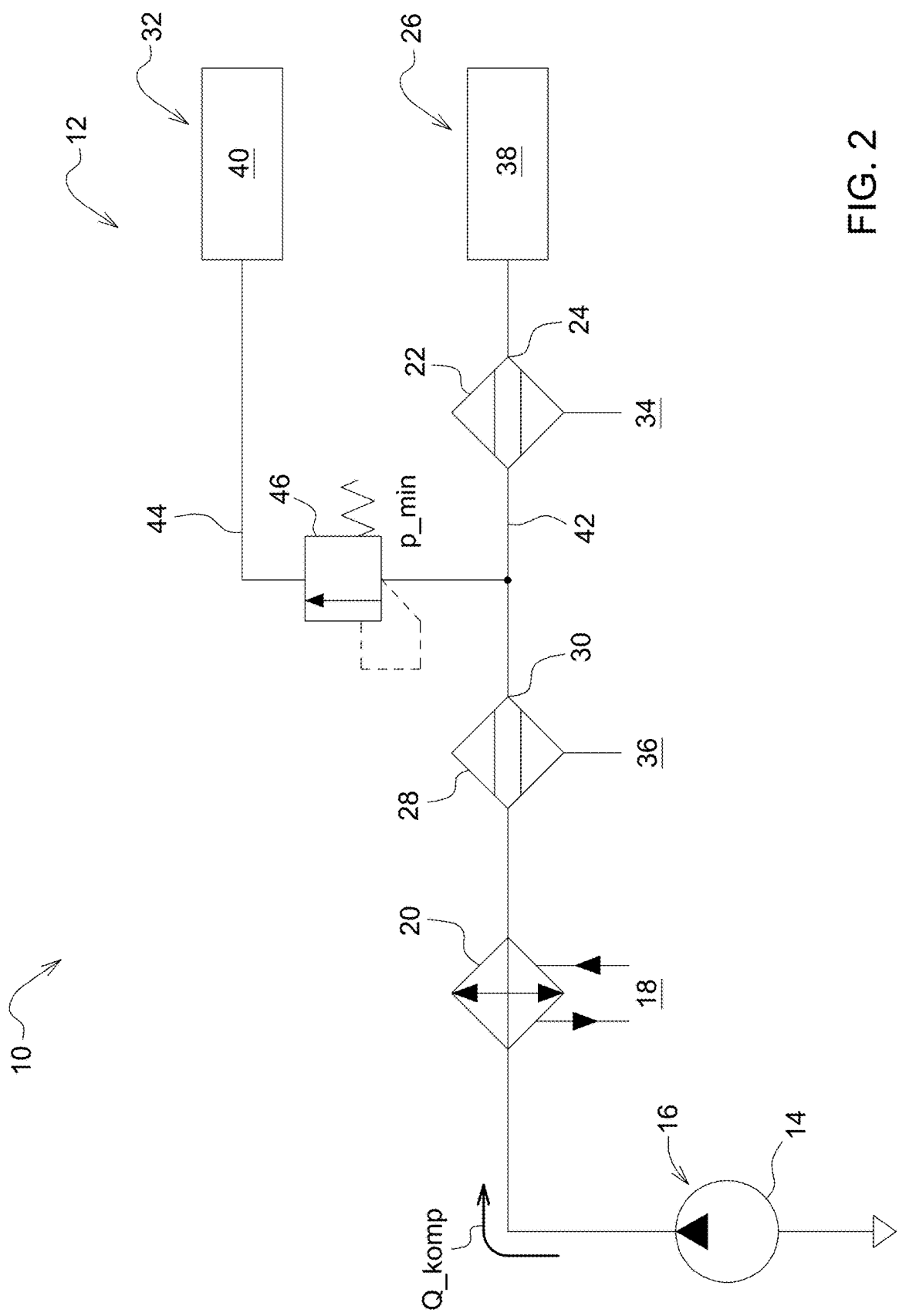
FIG. 2 shows a schematically illustrated block diagram of a second exemplary embodiment of the pneumatic supply device.

FIG. 2 shows a schematically illustrated block diagram of a second exemplary embodiment of the pneumatic supply device.

As can be seen, the cooled air flow Q_komp coming from the cooler 20 in this further embodiment of the pneumatic supply device 12 first of all passes through the second air dryer 28 and is then divided in order to supply the second pneumatic consumer group 32 and the first air dryer 22. The second air dryer 28 thus serves as a pre-dryer for the first air dryer 22, which is located in the first supply line 42. The flow capacity of the second air dryer 28 or pre-dryer formed thereby is chosen so that it can reliably cover the total compressed air consumption of the two pneumatic consumer groups 26, 32. In this case, the pressure switching valve 46 is arranged in the second supply line 44 between the second air dryer 28 and the second pneumatic consumer group 32.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A pneumatic supply device for an agricultural tractor, comprising:
   a compressed air source for producing a compressed air flow;
   a cooler for producing a cooled air flow;
   a first air dryer, which is fed with the cooled air flow, supplies a first pneumatic consumer group with dehumidified compressed air via a first dryer outlet in accordance with a first dehumidification and flow capacity; and
   a second air dryer, which is fed with the cooled air flow, supplies a second pneumatic consumer group with dehumidified compressed air via a second dryer outlet in accordance with a second dehumidification and another flow capacity;
   wherein the second pneumatic consumer group is supplied with the cooled air flow via an upstream pressure switching valve, wherein, when a predetermined supply pressure is undershot, the pressure switching valve adopts a closed position, with the result that the cooled air flow is available exclusively to the first pneumatic consumer group.

2. The pneumatic supply device of claim 1, wherein the cooled air flow is divided and fed in parallel to the first and the second air dryers.

3. The pneumatic supply device of claim 1, wherein the cooled air flow is first of all passed through the second air dryer and then divided in order to supply the second pneumatic consumer group and the first air dryer.

4. An agricultural tractor, comprising:
   a compressed air source for producing a compressed air flow;
   a cooler for producing a cooled air flow;
   a first air dryer, which is fed with the cooled air flow, supplies a first pneumatic consumer group with dehumidified compressed air via a first air dryer outlet in accordance with a first dehumidification and flow capacity; and
   a second air dryer, which is fed with the cooled air flow, supplies a second pneumatic consumer group with dehumidified compressed air via a second air dryer outlet in accordance with a second dehumidification and another flow capacity wherein the second pneumatic consumer group is supplied with the cooled air flow via an upstream pressure switching valve, wherein, when a predetermined supply pressure is undershot, the pressure switching valve adopts a closed position, with the result that the cooled air flow is available exclusively to the first pneumatic consumer group.

5. The agricultural tractor of claim 4, wherein the cooled air flow is divided and fed in parallel to the first and the second air dryers.

6. The agricultural tractor of claim 4, wherein the cooled air flow is first of all passed through the second air dryer and then divided in order to supply the second pneumatic consumer group and the first air dryer.

* * * * *